US011912034B2

(12) United States Patent
Schalk et al.

(10) Patent No.: US 11,912,034 B2
(45) Date of Patent: Feb. 27, 2024

(54) MAINTENANCE SCHEDULING

(71) Applicant: Hewlett-Packard Development Company, L.P., Spring, TX (US)

(72) Inventors: Wesley R Schalk, Vancouver, WA (US); Kris M English, Vancouver, WA (US); David Lawrence McCormick, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 17/640,014

(22) PCT Filed: Oct. 31, 2019

(86) PCT No.: PCT/US2019/059188

§ 371 (c)(1),
(2) Date: Mar. 3, 2022

(87) PCT Pub. No.: WO2021/086383

PCT Pub. Date: May 6, 2021

(65) Prior Publication Data

US 2022/0324232 A1 Oct. 13, 2022

(51) Int. Cl.
*B41J 2/165* (2006.01)
*B41J 2/045* (2006.01)
*B41J 2/21* (2006.01)

(52) U.S. Cl.
CPC ....... *B41J 2/16517* (2013.01); *B41J 2/04551* (2013.01); *B41J 2/04586* (2013.01); *B41J 2/2132* (2013.01); *B41J 2002/16573* (2013.01)

(58) Field of Classification Search
CPC ................ B41J 2/16517; B41J 2/04551; B41J 2/04586; B41J 2/2132; B41J 2002/16573; B41J 2/16526; B41J 2/16552
See application file for complete search history.

(56) References Cited

U.S. PATENT DOCUMENTS

| | | | |
|---|---|---|---|
| 6,631,976 B2 | 10/2003 | Hamamoto et al. | |
| 7,513,594 B2 | 4/2009 | Park | |
| 7,699,446 B2 | 4/2010 | Silverbrook | |
| 2002/0140790 A1* | 10/2002 | Moriyama ............ | B41J 2/2114 347/96 |
| 2006/0087708 A1 | 4/2006 | Lapstun et al. | |

FOREIGN PATENT DOCUMENTS

| | | |
|---|---|---|
| EP | 1034935 A1 | 9/2000 |
| EP | 1882591 B1 | 9/2011 |
| EP | 2821858 B1 | 6/2020 |

* cited by examiner

*Primary Examiner* — Lisa Solomon
(74) *Attorney, Agent, or Firm* — Brooks, Cameron & Huebsch, PLLC

(57) ABSTRACT

Examples describe maintenance scheduling of printhead in an image forming device by monitoring image data processed by an image forming device, determining that the image data processed by the image forming device comprises color image data, and generating a firing signal based on a mode of the image forming device.

15 Claims, 5 Drawing Sheets

MAINTENANCE SCHEDULING

BACKGROUND

Image forming devices and systems may implement multiple modes of operation based on detected circumstances or user settings. For example, an image forming device may be operable in different modes to conserve power, resources, or change overall performance based on user settings or performance constraints.

DETAILED DESCRIPTION

Figure 1:
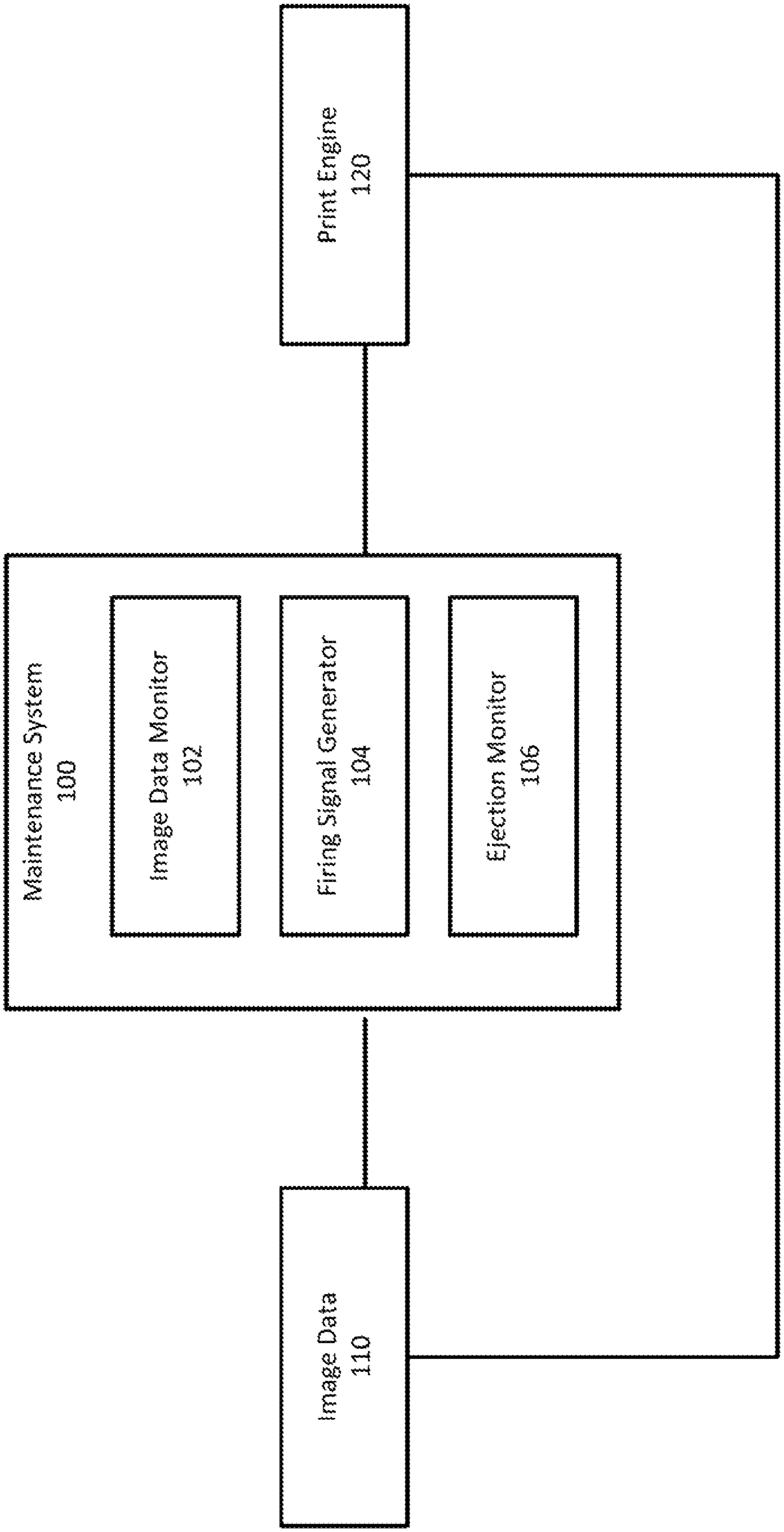
FIG. 1 is a block diagram illustrating example components of image forming systems as described herein.

To maintain quality in some image forming devices, such as inkjet printers, the image forming devices may regularly fire printing fluid from nozzles, or other printing fluid ejectors, when the printhead is not in a capped state. During some print jobs, processing the print job is sufficient to maintain nozzle health. For example, printing fluid ejected during printing is sufficient when each nozzle is firing printing fluid at regular intervals. Occasionally maintenance printing fluid may be ejected from nozzles that are not activated within a specific time while out of a capped state to prevent nozzles drying out. The maintenance printing fluid may be ejected into a portion of the image forming device rather than on a print media and may therefore be considered waste when viewing the overall efficiency of an image forming device. For example, maintenance printing fluid can be ejected into service reservoirs where the printing fluid is no longer usable for printing and therefore increases cost of printing.

In general, maintenance printing fluid can be reduced at the expense of print quality. For example, the reduction in ejection of maintenance printing fluid may cause temporary clogs in printhead nozzles. This can result in intermittent bands where white bands or other print defects are visible in a printed image. Depending on performance requested by a user of an image forming device, a user's experience with the device may be better with higher performance printing based on higher maintenance printing fluid usage or based on lower printing fluid usage but with potential defects based on lower maintenance printing fluid usage.

Systems and methods disclosed herein cover methods to reduce maintenance printing fluid in print modes that indicate a user preference for efficiency over print quality performance and to increase maintenance printing fluid in print modes that indicate a user preference for print quality performance over efficiency. Typically, cyan, magenta, and yellow printing agents or colorants are more expensive than similar amounts of black printing agents or colorants. Depending on the application or the industry, the disparity can lead to a substantially greater expense for color printing in color versus black and white printing. Some users may attempt to address this additional expense by printing documents in greyscale, or black and white mode, while selectively printing documents in full color mode. Often, black and white mode versions of color documents lack significant information or distinctions that users may find valuable. Other users may attempt to address the additional expense by printing color documents in a depleted color mode with depleted colors that compromise print quality.

In some examples, high quality print modes may include modes with full color printing by an image forming device. For example, an image forming device may provide a normal operation where colors and black printing fluid are printed at a standard rate. A higher performance mode may provide high quality printing based on increasing saturation or density of various colors or black portions. Furthermore, a depletion mode may provide printing options at a reduced quality by reducing the amount of color printing fluid ejected, reducing the amount of black printing fluid ejected, or reducing both to create a balanced but lower quality image that may also print at higher speeds. While described herein as generally providing three print modes, various examples may provide image forming device with fewer or additional print modes. For example, the print modes may be selected by a user on a sliding scale based on user preference. In addition, while color printing fluid depletion may provide additional cost savings compared to black printing fluid depletion, examples described herein may be enabled on a mono-chrome printer or other image forming devices operating in modes with various combinations of color and black printing fluid provided.

To provide improved maintenance printing fluid utilization in various print modes, systems and methods described herein may schedule reduced maintenance printing fluid scheduling in depletion modes of an image forming device. In example depletion modes, as further described below, these high efficiency print modes may deplete black printing fluid by up to 20% and color printing fluid by up to 90% in comparison to standard print modes. This reduces the cost of color deposition on print media while extending the yield of a set amount of supplies. Without reducing maintenance printing fluid in depletion print modes, the ratio of maintenance printing fluid to printing fluid on the print media increases thereby increasing the percentage of printing fluid that is generated during maintenance printing fluid deposition. Reducing maintenance printing fluid further reduces the cost of printing while also extending supply yield. Furthermore, service components that accept maintenance printing fluid also receive less maintenance printing fluid for a same amount of printing which extends the life of such as service components.

Due to the printing fluid reduction, in depleted modes of operation, an image forming device may create lower contrast, optical density or saturation of colors on print media. Accordingly, a formed image with more frequent print defects may generate harder to detect white bands or other defects due to the reduced contrast on the formed image. Furthermore, to limit the visibility of such defects, the maintenance scheduling described herein may limit maintenance printing fluid reduction for dark colors such as black while significantly reducing maintenance printing fluid for light colors such as cyan, magenta and yellow. Therefore, the quality of black printing fluid deposition may remain at a higher quality and further reduce contrast for potential defects from color printing fluid deposition. This also may improve overall cost savings as cyan, magenta, and yellow maintenance printing fluid may be more expensive than black printing fluid so reducing waste printing fluid provides further benefit to a user. Therefore, the reduction of maintenance printing fluid does not greatly reduce reliability of the printhead, but instead is designed to improve print cost and increase supply yield. In some examples, a user may be enabled to adjust the likelihood of defects by setting a maintenance printing fluid setting in different print modes.

In some examples, in order to operate in heavily depleted print modes, an image forming device may adjust the color space provided in image data to the print device to a color space that utilizes a reduced amount of printing fluid. A color space as used herein describes colors used by an image forming device numerically. Example color spaces can include subtractive color space, which can include a type of cyan-magenta-yellow-key (black) (CMYK) color space, while others may employ a type of additive color space, which can include a type of red-green-blue (RGB) color space. For example, a color represented in an RGB color space has a red value, a green value, and a blue value, and a color represented in a OMYK color space has a cyan value, a magenta value, a yellow value, and a key value, that combine numerically to represent the color. A color gamut for a device is a property of the device that includes the range of color (and density/tonal values) that the device can produce as represented by a color space. A color in the additive color space can be represented via a red component, a green component, and a blue component, and a color in the subtractive color space can be represented via a cyan component, magenta component, a yellow component, and a black component. Furthermore, as used in this disclosure, a process color component includes the cyan, magenta, and yellow components in the subtractive color space and does not include the black component in the subtractive color space.

In order to reduce the amount of color printing fluid used in a depletion mode of a printer, the amount of color printing fluid may be significantly decreased, for example by up to 90%. The amount of black printing fluid may also be reduced by a lower amount, for example by up to 20%, in order to maintain visibility, vibrancy, and text readability of a formed image while reducing the printing fluid due to improved optical density. Depending on the example and implementation, the color and black printing fluid may be reduced by different amounts. For example, the color printing fluid may be reduced by 70%, 80-95%, 70-90% or another amount. Furthermore, these amounts may vary based on the image data and settings describing the print quality expected. The reduction may be based on device dependent characteristics that change the amount of device specific printing fluid that affects the quality of the formed image.

Image forming devices as used herein may include printers, copiers, fax machines, multifunction devices including additional scanning, copying, and finishing functions, all-in-one devices, pad printers to print images on three dimensional objects, and three-dimensional printers (additive manufacturing devices) may employ color management systems including depletion modes, standard modes, and high-quality modes as described herein. Furthermore, print media may be used herein to describe plain paper or other suitable media or objects such as inflexible media, textiles, bulk objects, boxes, powdered build materials (for forming three-dimensional articles), or other suitable substrates. Printing fluids, including printing agents and colorants, may include ink, fusing agents, detailing agents, or other materials that may be applied to a substrate with a printhead that includes a nozzle that utilizes a maintenance printing fluid scheduling system to provide consistent operation of a printhead. For example, thermal inkjet printheads, piezo inkjet printheads, or other printheads that eject printing fluids to a print media may be operated according to example systems and methods as described herein.

FIG. 1 illustrates example components of an image forming device to provide maintenance printing fluid control and scheduling during operation of the image forming device in various print modes. The image forming device includes a maintenance system 100 that uses image data 110 to control aspects of a print engine 120. The maintenance system may include an image data monitor 102, a firing signal generator 104, and an ejection monitor 106.

The image data 110 may include image data stored on an image forming device or image data received at an image forming device. In some examples, the image data 110 may include image data after it has been processed by the image forming device to generate a set of firing instructions for print engine 120 that determines which nozzles will be actuated to form an image on an image forming device 120. In various examples, the image data 110 as monitored by the maintenance system 100 may include data indicating whether there is color to be printed on an upcoming portion of a print job or whether the color nozzles of a printhead are to be actuated to eject printing fluid onto print media. In addition, in some examples, the image data 110 as monitored by the maintenance system 100 may include data regarding the size of the media that is to be printed. Accordingly, the maintenance system 100 may further determine reactive maintenance printing fluid ejection based on lack of usage for portions of a print bar that are not activated during a print job. For example, in an example system with a print bar perpendicular to a paper path of print media, only certain nozzles may be activated during a print job and others may be unused. Accordingly, the maintenance printing fluid scheduling may be defined for nozzles outside the print area and inside the print area separately based on preventative or reactive ejections as described herein based on their usage.

The maintenance system 100 includes an image data monitor 102 to monitor the image data 110 so as to determine the instructions that are being sent to the print engine 120. For example, the image data monitor 102 may monitor to determine if one or more color nozzles are to be activated by the print engine 120 with firing instructions. If one or more color nozzles are to be actuated, that is an indication that the printhead will be uncapped for at least a portion of time, which further indicates that there is an opportunity that nozzles of the color printing fluid ejectors may dry out and later generate a print error. The image data monitor 102 may provide an indication to firing signal generator 104 that one or more printheads will be uncapped and to determine whether maintenance printing fluid should be ejected.

Figure 3:
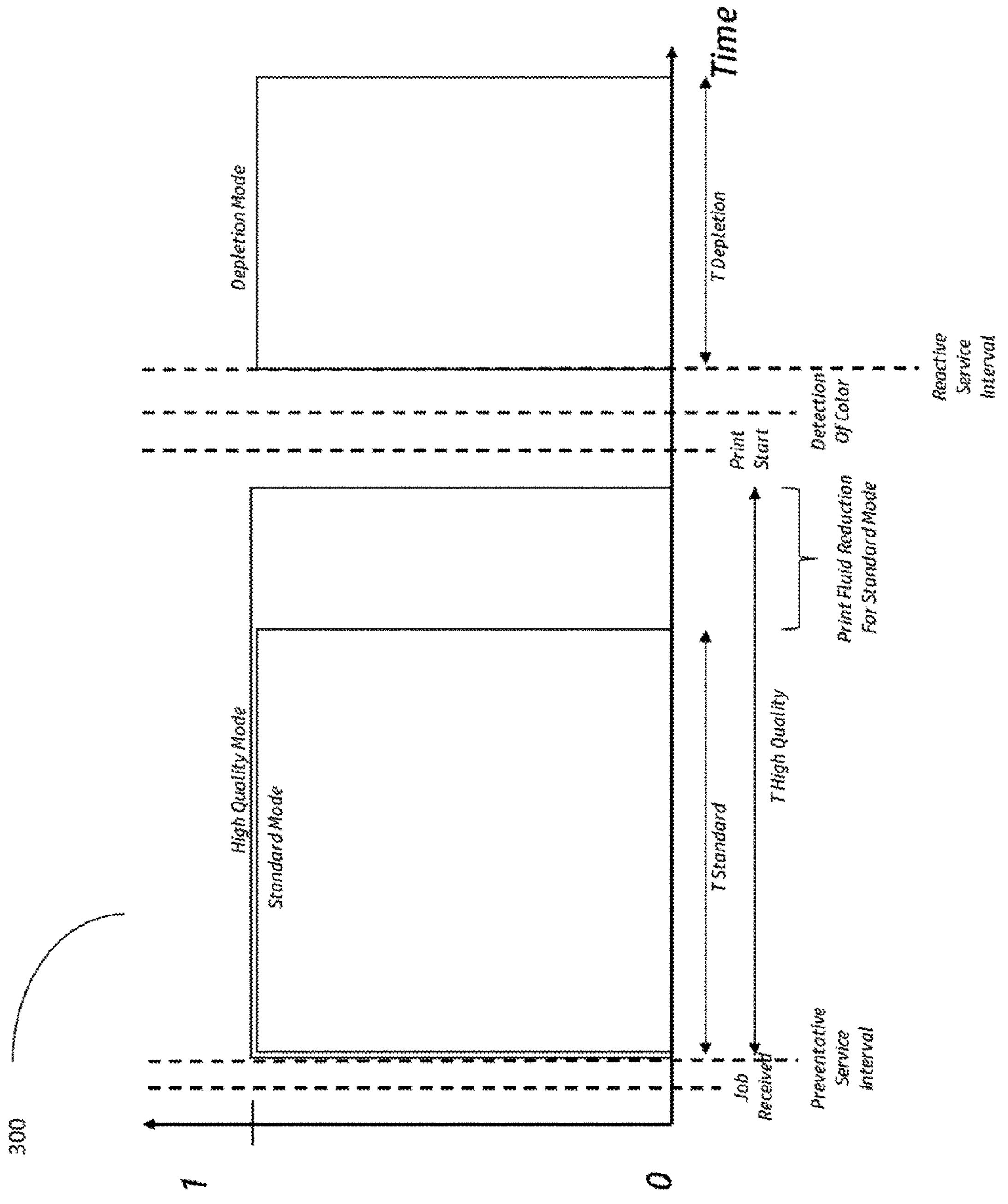
FIG. 3 is an example timing diagram of scheduled maintenance activities as described herein.

The firing signal generator 104, after receiving an indication from image data monitor 102 regarding the image data 110 provided to print engine 120, may determine whether to eject maintenance printing fluid to reduce the likelihood of defects in forming an image on a print medium. For example, the firing signal generator 104 may use a current mode of the image forming device to determine an appropriate scheduling for maintenance printing fluid. FIG. 3 is an example timing diagram of scheduled maintenance activities as described herein.

FIG. 3 illustrates a timing diagram 300 of the generation of maintenance printing fluid firing signals for color printheads. In the example, firing determination are shown as a binary decision of whether to fire maintenance printing fluid for color printheads based on the image data 110 monitored by image data monitor 102. The timing diagram shows the maintenance printing fluid scheduling for three print modes: a high-quality mode, a standard mode, and a depletion mode. As shown after a job is received by the image forming device, in the high-quality mode and the standard mode, preventative service may be scheduled to ensure the nozzles are ready to print prior to the print start time. In the standard mode, the service interval may be shorter than in the high-quality mode providing a printing fluid reduction compared to the high-quality mode. As the color nozzles perform preventative maintenance at this time, the black nozzles may also eject maintenance printing fluid.

In the depletion mode the nozzles of the printing fluid ejectors may not eject preventative maintenance prior to the print start time. Although a timing diagram of black maintenance printing fluid scheduling is not shown, preventative maintenance printing fluid may be ejected in a similar manner as shown for the standard or high-quality modes. For example, as discussed herein, the black printing fluid may be reduced less than the color printing fluid in the depletion mode and may also be assumed to be used in each print job to set a level of optical density.

As shown in the timing diagram 300, a reactive service interval is set in the depletion mode after there is a detection of color after the print start time. In some examples, the reactive service interval in the depletion mode may be of a shorter duration than the preventative modes that are used during the preventative maintenance printing fluid ejections of the standard and high-quality modes. Accordingly, in the depletion mode, there may be waste savings from both the preventative firing of maintenance printing fluid as well as the amount of maintenance printing fluid fired. As discussed, this may result in low severity, low detectability, or temporary print defects, but provide more efficient printing.

Although not shown in the timing diagram 300, as image data is continually printed after print start, an ejection monitor 106 may monitor the image data 110 and resulting firing of printing fluid from nozzles by print engine 120 to determine subsequent maintenance printing fluid firing. Referring back to FIG. 1 the ejection monitor 106 may continue to monitor firing performed by the printheads to determine whether or not to fire additional maintenance printing fluid as the print job is processed. The determination may be based on the frequency of firing signals to nozzles by the print engine 120 as well as a determined print mode. For example, reactive scheduling of maintenance printing fluid may be performed more often in a high-quality print mode than a standard print mode and more often in a standard print mode than a depletion print mode. Furthermore, the amount of maintenance printing fluid may also be higher in the high-quality print mode than a standard print mode and higher in the standard print mode than a depletion print mode. The ejection monitor 106 may provide the information to the firing signal generator 104 for the firing signal generator 104 to generate maintenance printing fluid firing signals to the print engine 120.

The print engine 120 may use the image data 110 to generate firing signals to actuate particular nozzles to generate an image on a print medium. The print engine 120 also receives firing signals from maintenance system 100 (as generated by firing signal generator 104) indicating that maintenance printing fluid should be ejected from one or more printheads. For example, the firing signals may indicate that the print engine 120 should fire maintenance printing fluid from black printing fluid nozzles, color printing fluid nozzles, or each of the black printing fluid and color printing fluid nozzles.

The components of an image forming device shown in FIG. 1 are a subset of components of a complete image forming device. In various examples the image forming device may include media handling components, media storage components, scanning components, output trays, or additional components to complete an image forming device. In some examples, the components shown may be incorporated into larger systems, such as three-dimensional printing systems, solid media (e.g., corrugated cardboard or the like), or other media, that utilize printing fluid ejection including maintenance printing fluid ejection.

Figure 2:
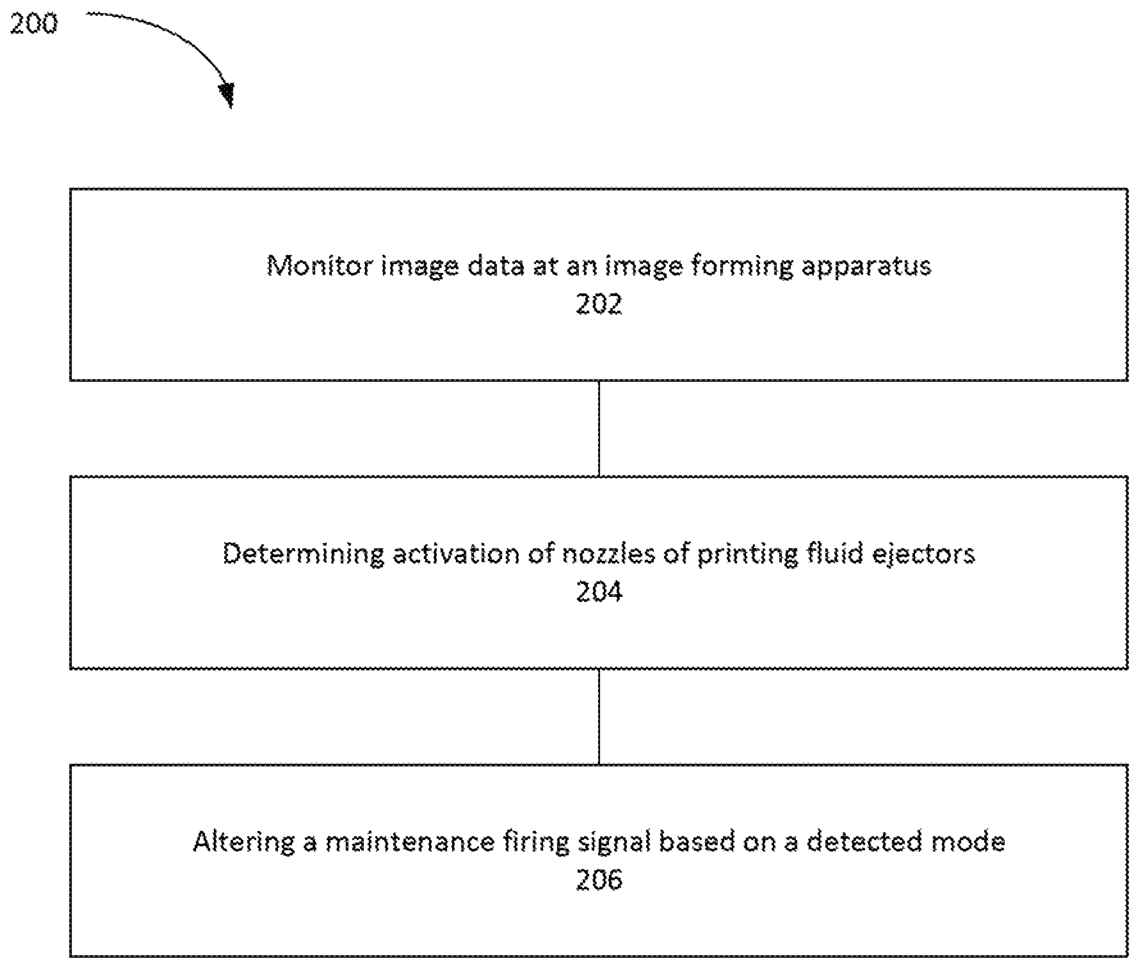
FIG. 2 is a flow chart illustrating an example method to schedule maintenance activities for an image forming device as described herein.

FIG. 2 is a flow diagram 200 illustrating an example method to schedule firing of maintenance printing for an image forming device as described herein. For example, the flow diagram may be performed by the components of an image forming device as described with reference to FIG. 1. In various examples, the processes described in reference to flow diagram 200 may be performed in a different order or the method may include fewer or additional blocks than are shown in FIG. 2.

Beginning in block 202, an image forming device monitors image data processed by the image forming device. For example, the image data may include firing commands for a printhead of the image forming device. In some examples, the image data may include image data for color printing aspects and black printing aspects. The image data may include firing instructions to be used by a print engine to form an image by ejecting printing on a print medium. In some examples, the monitoring of image data is performed in response to a determination that the image forming device is operating in a particular mode. For example, a maintenance system of the image forming device may monitor the image data in a depletion mode to determine maintenance ejection scheduling differently than when in a high-quality, standard, or other mode of operation.

In block 204 the image forming device determines activation of nozzles of printing fluid ejectors based on the monitored image data. For example, the image data may include separate streams for black image data and color image data. For example, the image forming device may monitor a stream of image data for an indication of an instruction to fire a nozzle of a color printing fluid ejector. In some examples, the print jobs may be monitored prior to the start of printing to determine if there will be firing of color nozzles during a page of media or other interval of print time. For example, the image data may be monitored at the beginning of a maintenance ejection of a black printhead to determine whether to also perform maintenance ejection of a color printhead. Therefore, based on the monitored image data, the image forming device may determine which nozzles to alter a maintenance schedule for to reduce print defects without reactively activating nozzles that will not be utilized.

If the color image data stream, or a color component of a single image data stream, indicates color is included in the image data, the image forming device may continue in block 206 to alter a maintenance firing signal based on a mode of the image forming device. For example, the color nozzles may have been capped and the image forming device may determine that maintenance printing fluid should be ejected to ensure proper operation of the nozzles and reduce potential print defects during formation of an image. In some examples, the amount of maintenance printing fluid to eject may be based on an operating mode. For example, in a depletion mode, less maintenance printing fluid may be ejected than in other modes. In some examples, the amount of maintenance printing fluid may be determined based on a user selection of print quality (which may be a continuous value) and tolerance of print defects.

Figure 4:
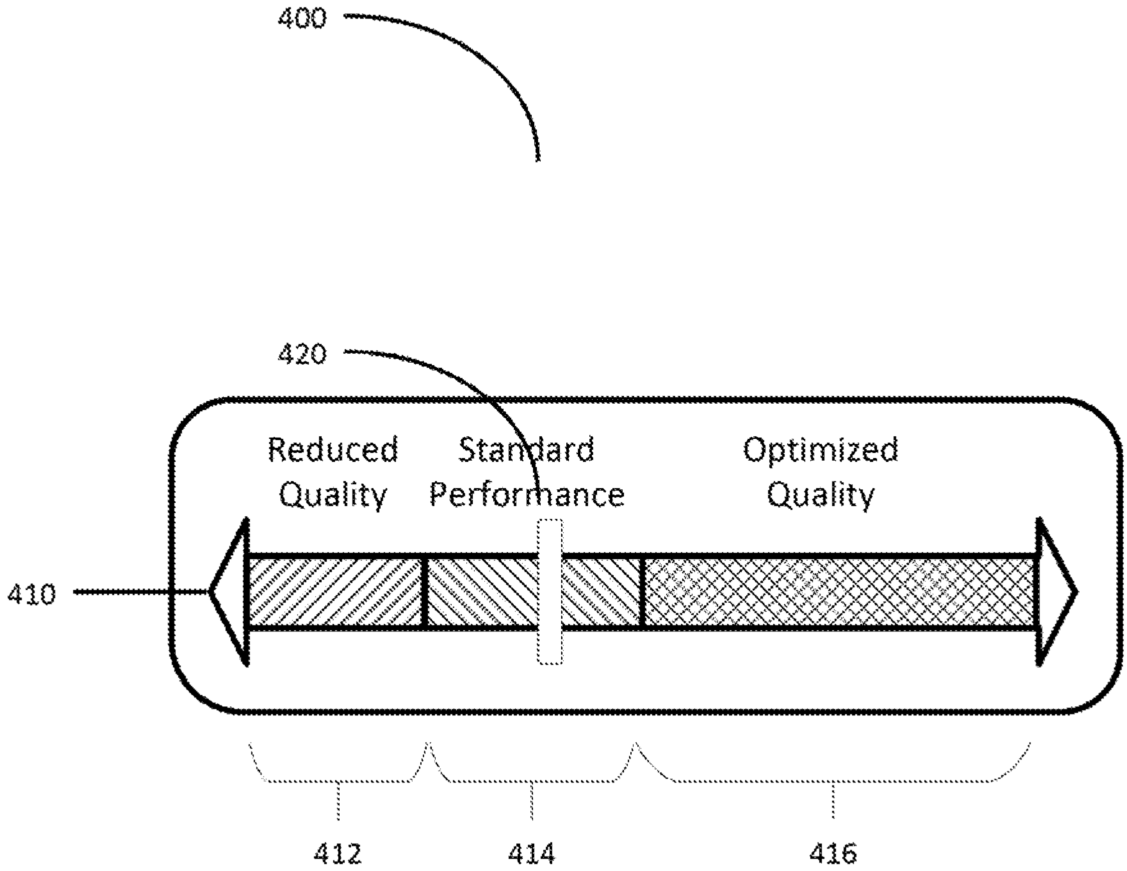
FIG. 4 is an example user interface as may be implemented by devices and systems as described herein.

FIG. 4 is an example user interface 400 as may be implemented by an image forming device as described herein. For example, the user interface may be on a surface of an image forming device as described above with reference to FIG. 1, as part of a mobile application on a user device that communicates settings or preferences of one or more users to configure a printing device, as part of an application on a browser or computing device that offers configuration parameters to administrators or user, or as part of another interface that a user can interact with.

The user interface 400 includes a slider 410 that a user can interact with using a selector 420. In the example shown, the slider 410 includes multiple regions 412, 414, and 416. In various examples, the slider 410 may include no separate regions, fewer regions, or additional regions. Accordingly, the regions are shown in the user interface 400 as a potential example implementation of an additional feature of the disclosed systems and methods. Based on received user input, the image forming device may update an operating mode or a maintenance printing fluid mode.

In some examples, the reduced quality region 412 indicates a depletion mode or an indication by the user that some noticeable defects caused by a lower rate of maintenance printing fluid ejection may be acceptable to the user. In some examples, the reduced quality region 412 may be intended as a warning to a user that visible defect may occur due to significant periods between spitting of maintenance printing fluid. However, the user may select performance in this region for faster more efficient performance The standard performance region 414 may indicate operation in a normal mode which should not have print defects but may not have maximum contrast or color density. The optimized quality region 416 may indicate the quality is important for the current or upcoming print jobs. The user may change the level of maintenance printing fluid that is used by moving a selector 420. For example, by moving the selector 420 to the left, the image forming device may eject less maintenance printing fluid during operation with the tradeoff of having higher risk of print defects. By moving the selector 420 to the right, the image forming device may eject more maintenance printing fluid during operation to achieve fewer defects and higher print quality.

In some examples, the slider 410 may control the amount of maintenance printing fluid that is ejected, but may not have an affect on the operating mode of the image forming device. For example, the image forming device may provide the slider 410 with a range that conforms to quality parameters corresponding to a selected operating mode. In some examples, the amount of maintenance printing fluid ejected may be determined by a selected operating mode and the slider 410 may determine the operating mode. Notably the selection of the operating mode may be discrete intervals, a set of selections, or may be on a continuous scale.

The user interface 400 is intended as an example of many possible user interfaces. Additional examples may include control wheels, numerical inputs, radio button selections, or other user interface elements. Furthermore, additional user interfaces may offer additional control over the frequency or amount of maintenance printing fluid that is used or may enable a user to set the amount to reduce automatically in response to certain events, such as data received with a print job, current status of the image forming device (e.g., supply levels or service component capacity), or other personalization of the image forming device operation.

Figure 5:
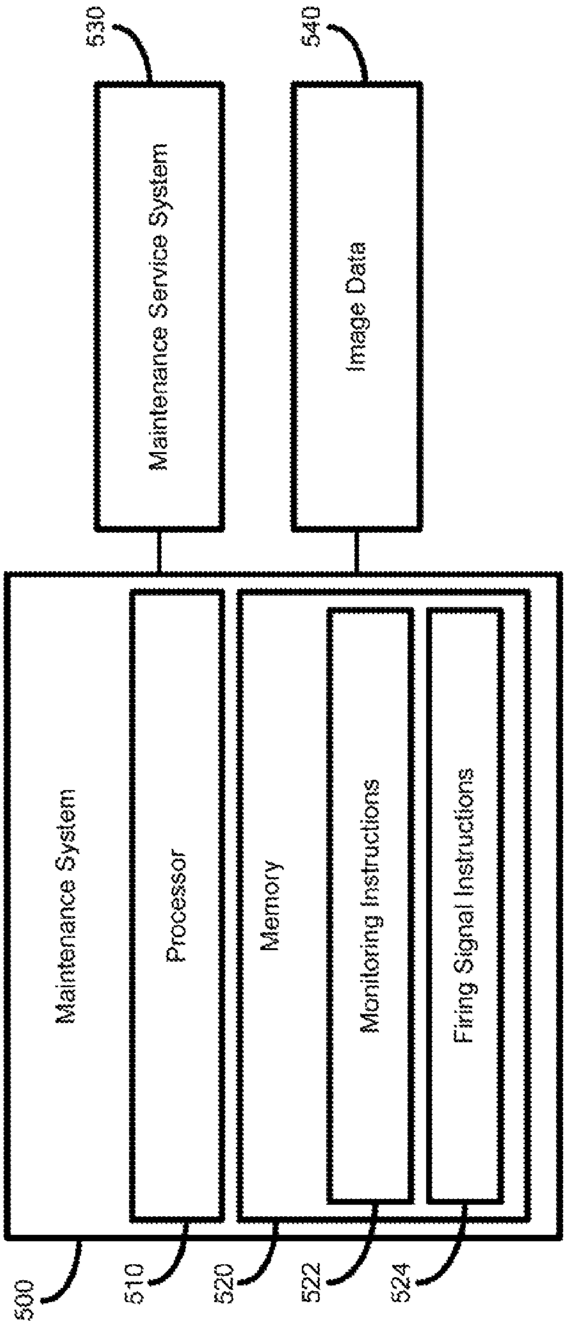
FIG. 5 is a block diagram illustrating example components of image forming systems as described herein.

FIG. 5 is a block diagram illustrating an example maintenance system 500 of an image forming device as described herein. Maintenance system 500 may include at least one computing device that is capable of communicating with at least one remote system. In the example of FIG. 5, maintenance system 500 includes a processor 510 and a memory 520. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 510 may be a central processing unit (CPUs), a microprocessor, and/or other hardware devices suitable for retrieval and execution of instructions stored in memory 520. In the example system 500, processor 510 may receive, determine, and send monitoring instructions 522 and firing signal instructions 524 to generate maintenance scheduling for an image forming device. As an alternative or in addition to retrieving and executing instructions, processor 510 may include an electronic circuit comprising a number of electronic components for performing the functionality of an instruction in memory 520. With respect to the executable instruction representations (e.g., boxes) described and shown herein, it should be understood that part or all of the executable instructions and/or electronic circuits included within a particular box and/or may be included in a different box shown in the figures or in a different box not shown.

Memory 520 may be any electronic, magnetic, optical, or other physical storage device that stores executable instructions. Thus, memory 520 may be, for example, Random Access Memory (RAM), an Electrically-Erasable Programmable Read-Only Memory (EEPROM), a storage drive, an optical disc, and the like. Memory may be disposed within maintenance system 100, as shown in FIG. 1. In this situation, the executable instructions may be “installed” on the system 500.

Monitoring instructions 522 stored on memory 520 may, when executed by the processor 510, cause the processor 510 to monitor image data 540 within an image forming device. For example, as discussed above, the maintenance system 500 may monitor image data 540 to determine when color printing fluid will be ejected by a color printhead. Based on the results of monitoring by the maintenance system 500, the firing signal instructions may cause the processor 510 to determine when to generate firing signals to provide to maintenance service system 530. The maintenance service system 530 may be part of a print engine and eject printing fluid into a service component. For example, the firing signal may be based on an operating mode of the image forming device as well as the image data 540 that is ejected by the printheads during image forming on a print media. In addition to the operations discussed, memory 520 may include additional instructions that enable additional systems and operations as described herein. For example, those processes described with respect to FIG. 1-4 may be performed based on instructions stored on memory 520 or executed by processor 510 as described with reference to maintenance system 500.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. In various examples other non-transitory computer-readable storage medium may be used to store instructions for implementation by processors as described herein. Accordingly, some examples provide a program comprising code for implementing a system or method as claimed in any preceding claim and a machine-readable storage storing such a program.

The features disclosed in this specification (including any accompanying claims, abstract and drawings), and/or the operations or processes of any method or process so disclosed, may be combined in any combination, except combinations where at least some of such features and/or processes are mutually exclusive.

Each feature disclosed in this specification (including any accompanying claims, abstract, and drawings), may be replaced by alternative features serving the same, equivalent or similar purpose, unless expressly stated otherwise. Thus, unless expressly stated otherwise, each feature disclosed is an example of a generic series of equivalent or similar features.

The invention claimed is:

1. A method of ejecting maintenance printing comprising:

monitoring image data processed by an image forming device;

determining activation of nozzles of printing fluid ejectors based on the image data processed by the image forming device; and altering a maintenance printing firing signal based on a mode of the image forming device.

2. The method of claim 1, wherein a first firing signal is generated in a first detected mode at a longer time interval than a second firing signal generated in a second detected mode.

3. The method of claim 1, wherein monitoring the image data processed by the image forming device is performed in response to determining that the image forming device is operating in a depletion mode.

4. The method of claim 1, further comprising:

determining that a nozzle of a color printing fluid ejector is activated by the image data; and ejecting maintenance ink for the nozzle of the color printing fluid ejector in response to determining it will be activated.

5. The method of claim 1, further comprising determining that the image forming device is operating in a depletion mode wherein color printing fluid is reduced by up to 90% and black printing fluid is reduced by up to 20%.

6. The method of claim 1, wherein the firing signal is altered for color printing fluid ejectors to reduce color maintenance printing fluid more than a reduction of black maintenance fluid.

7. The method of claim 1, further comprising ejecting maintenance printing fluid into a service component based on the firing signals.

8. A maintenance system, comprising:

a memory to store a set of instructions; and a processor to execute the set of instructions to:

determine an operating mode of an image forming device;

monitor image data processed by the image forming device; and alter a firing signal based on the operating mode of the image forming device and the monitored image data.

9. The maintenance system of claim 8, wherein the image forming device is operable in a standard mode, a high-quality mode, and a depletion mode.

10. The maintenance system of claim 8, wherein the processor is further to:

generate a user interface to receive user input; and update the operating mode based on a received user input.

11. The maintenance system of claim 8, wherein the processor is further to alter the firing signal in a first operating mode to fire for a longer time interval than a second operating mode.

12. The maintenance system of claim 8, wherein the processor is to monitor the image data processed by the image forming device in response to determining that the image forming device is operating in a depletion mode.

13. The maintenance system of claim 8, wherein the image forming device further comprises a service component and the processor is further to cause the image forming device to eject maintenance printing fluid into the service component of the image forming device based on the firing signal.

14. A non-transitory computer-readable storage medium comprising a set of instructions executable by a processor to:

determine that an image forming device is set to operate in a depletion mode, wherein the depletion mode reduces an amount of color printing fluid ejected to form an image;

monitor image data processed by the image forming device in response to the image forming device operating in a depletion mode; and alter a maintenance firing signal for a printing fluid ejector of the image forming device based on a utilization of the printing fluid ejector in the monitored image data.

15. The non-transitory computer-readable storage medium of claim 14, wherein the instructions further cause the processor to operate in the depletion mode by reducing color printing fluid to print a page by 70-90%.

* * * * *